US012217597B2

(12) United States Patent
Zhao

(10) Patent No.: US 12,217,597 B2
(45) Date of Patent: *Feb. 4, 2025

(54) DETECTING ABNORMAL EVENTS FOR A MONITORING SYSTEM

(71) Applicant: Comcast Cable Communications, LLC, Philadelphia, PA (US)

(72) Inventor: Zhen Zhao, Berwyn, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/746,507

(22) Filed: May 17, 2022

(65) Prior Publication Data
US 2022/0277638 A1 Sep. 1, 2022

Related U.S. Application Data

(63) Continuation of application No. 16/439,094, filed on Jun. 12, 2019, now Pat. No. 11,355,000.

(51) Int. Cl.
*G08B 21/24* (2006.01)
*G06F 16/21* (2019.01)

(52) U.S. Cl.
CPC ........... *G08B 21/24* (2013.01); *G06F 16/219* (2019.01)

(58) Field of Classification Search
CPC ...... G08B 21/24; G08B 13/00; G08B 25/008; G08B 25/14; G08B 13/08; G06F 16/219
See application file for complete search history.

(56) References Cited

U.S. PATENT DOCUMENTS

| | | | |
|---|---|---|---|
| 8,786,425 B1 | 7/2014 | Hutz | |
| 9,165,455 B1* | 10/2015 | Hutz | .................... H04M 11/04 |
| 9,514,636 B2 | 12/2016 | Modi et al. | |
| 2010/0007482 A1 | 1/2010 | Leyden et al. | |
| 2015/0061859 A1 | 3/2015 | Matsuoka et al. | |
| 2015/0358537 A1 | 12/2015 | Mirza | |
| 2018/0091381 A1* | 3/2018 | McLaughlin | ......... G06F 3/0482 |
| 2018/0330599 A1 | 11/2018 | Burke et al. | |
| 2019/0180051 A1 | 6/2019 | Barday et al. | |

* cited by examiner

*Primary Examiner* — Brian Wilson
(74) *Attorney, Agent, or Firm* — Banner & Witcoff, Ltd.

(57) ABSTRACT

Systems, apparatuses, and methods are described for detecting a state transition for sensors of a monitoring system, and determining whether the state transition is abnormal such that further action is warranted. The determination may be based on a history of state transitions in the monitoring system, and may be based on whether the same state transition has previously occurred at a corresponding time in the history, whether the new state has previously occurred following the corresponding time in the history, and other factors.

21 Claims, 13 Drawing Sheets

State transitions occurred on Monday, Week 4
(four weeks before current time)

| State of Front Door Sensor 302 | State of Back Door Sensor 305 | State of Motion Sensor 307 | Time of States Reported |
|---|---|---|---|
| 0 | 0 | 0 | 12:00:00 |
| 0 | 1 | 0 | 13:15:11 |
| 0 | 1 | 1 | 15:20:09 |
| 0 | 0 | 1 | 17:40:01 |

FIG. 5

Monday 16:00:00 (Current Time)

| Front | Back | Motion | Time |
|---|---|---|---|
| 0 | 0 | 1 | 15:59:59 |
| 0 | 1 | 1 | 16:00:00 |

601

Week 1: Monday (one week ago) 602

| Front | Back | Motion | Time |
|---|---|---|---|
| 0 | 0 | 0 | 12:00:00 |
| 0 | 0 | 1 | 14:31:11 |
| 0 | 1 | 1 | 15:30:11 |
| 1 | 0 | 1 | 17:40:00 |

606

Week 2: Monday (two weeks ago) 603

| Front | Back | Motion | Time |
|---|---|---|---|
| 1 | 0 | 1 | 12:00:00 |
| 1 | 0 | 0 | 14:45:19 |

Week 3: Monday (three weeks ago) 604

| Front | Back | Motion | Time |
|---|---|---|---|
| 1 | 1 | 0 | 12:00:00 |
| 0 | 0 | 1 | 14:25:02 |
| 0 | 1 | 1 | 18:31:33 |

607

Week 4: Monday (four weeks ago) 605

| Front | Back | Motion | Time |
|---|---|---|---|
| 1 | 1 | 0 | 12:00:00 |
| 0 | 0 | 1 | 13:15:11 |
| 0 | 1 | 1 | 15:20:09 |
| 0 | 0 | 1 | 17:40:01 |

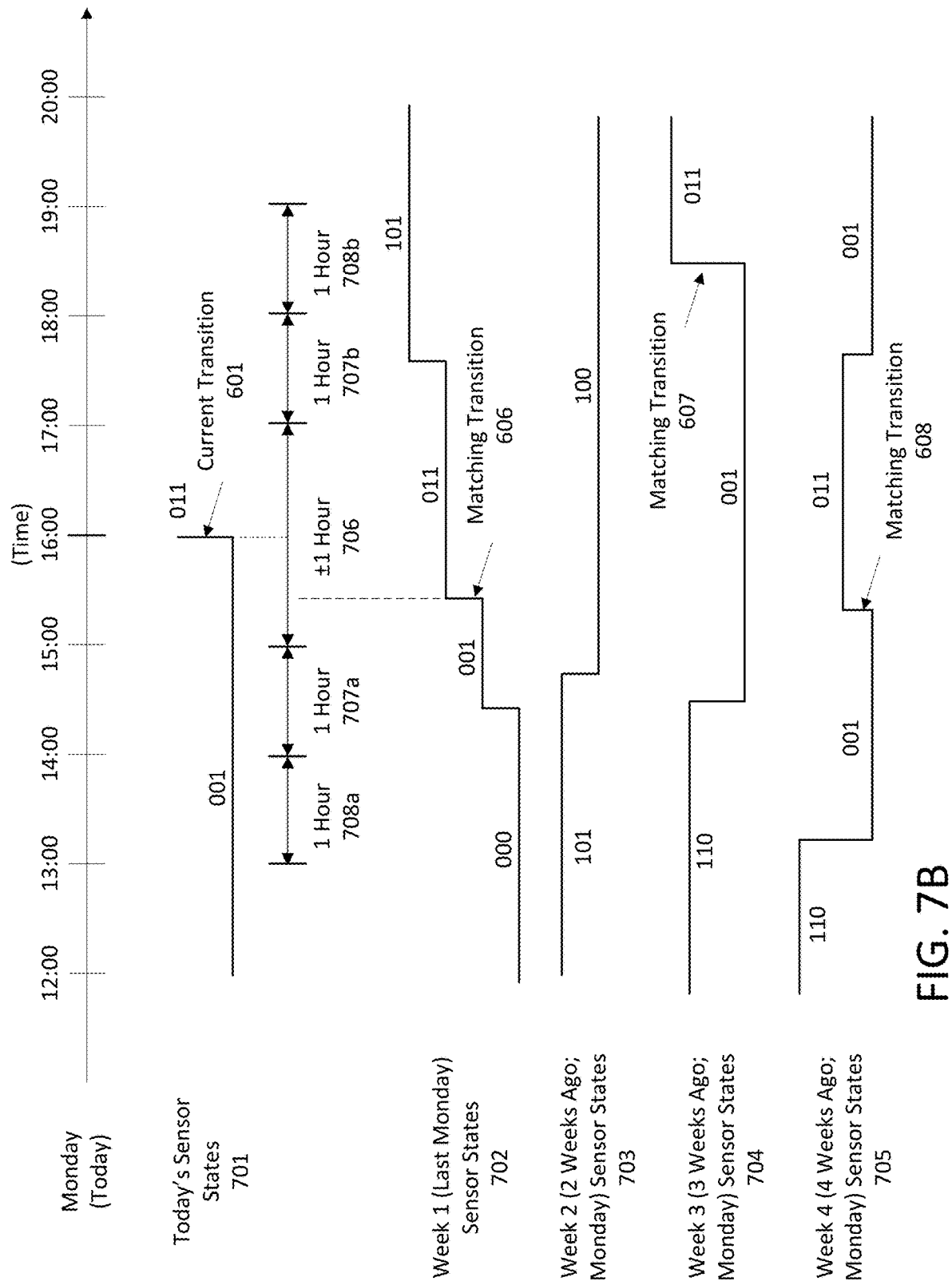

DETECTING ABNORMAL EVENTS FOR A MONITORING SYSTEM

CROSS-REFERENCE TO RELATED APPLICATIONS

This application is a continuation of U.S. application Ser. No. 16/439,094, filed on Jun. 12, 2019, which is hereby incorporated by reference in its entirety.

BACKGROUND

A monitoring system, such as a security system, may provide a variety of security sensors to monitor premises. The system may detect various activities such as opening of doors or windows and alert one or more users of the system. The system will notify the users while the system is turned on, or armed. However, the users may forget to turn on the security system, such as when leaving for work on a busy morning, or going to sleep late at night, and this may leave the users vulnerable. This vulnerability may be exacerbated if the user needs to arm and disarm the system several times throughout the day. These and other shortcomings are addressed by the present disclosure.

SUMMARY

The following summary presents a simplified summary of certain features. The summary is not an extensive overview and is not intended to identify key or critical elements.

Systems, apparatuses, and methods are described for detecting security events at premises monitored by security sensors. A security controller may monitor states of a plurality of security sensors, and may track a history of the various combinations of security sensor states. If the combination of security sensor states changes to a new combination of security sensor states, the security controller may determine several factors to determine whether the current sensor state change should be signaled for possible alarm. First, the security controller may determine a state transition score indicating how normal it is for the same state transition to have occurred at the same time of day in the history. Second, the security controller may determine a new state score indicating how normal it is for the security system to be in the new security sensor state, for example, at the current time of day. The security controller may determine time windows within the state history, and weights of the time windows, and use these windows and weights to determine the scores. The controller may send an anomalous activity alert to users based on these scores. This state transition analysis may be performed regardless of whether a user arms or disarms the security system. Even if the security controller is turned off, or unarmed, users may receive a security notification from the controller. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5 shows an example state history of a security system.

FIG. 6 shows another example state history of a security system.

FIGS. 7A to 7C show example timelines of a security system.

DETAILED DESCRIPTION

Figure 1:
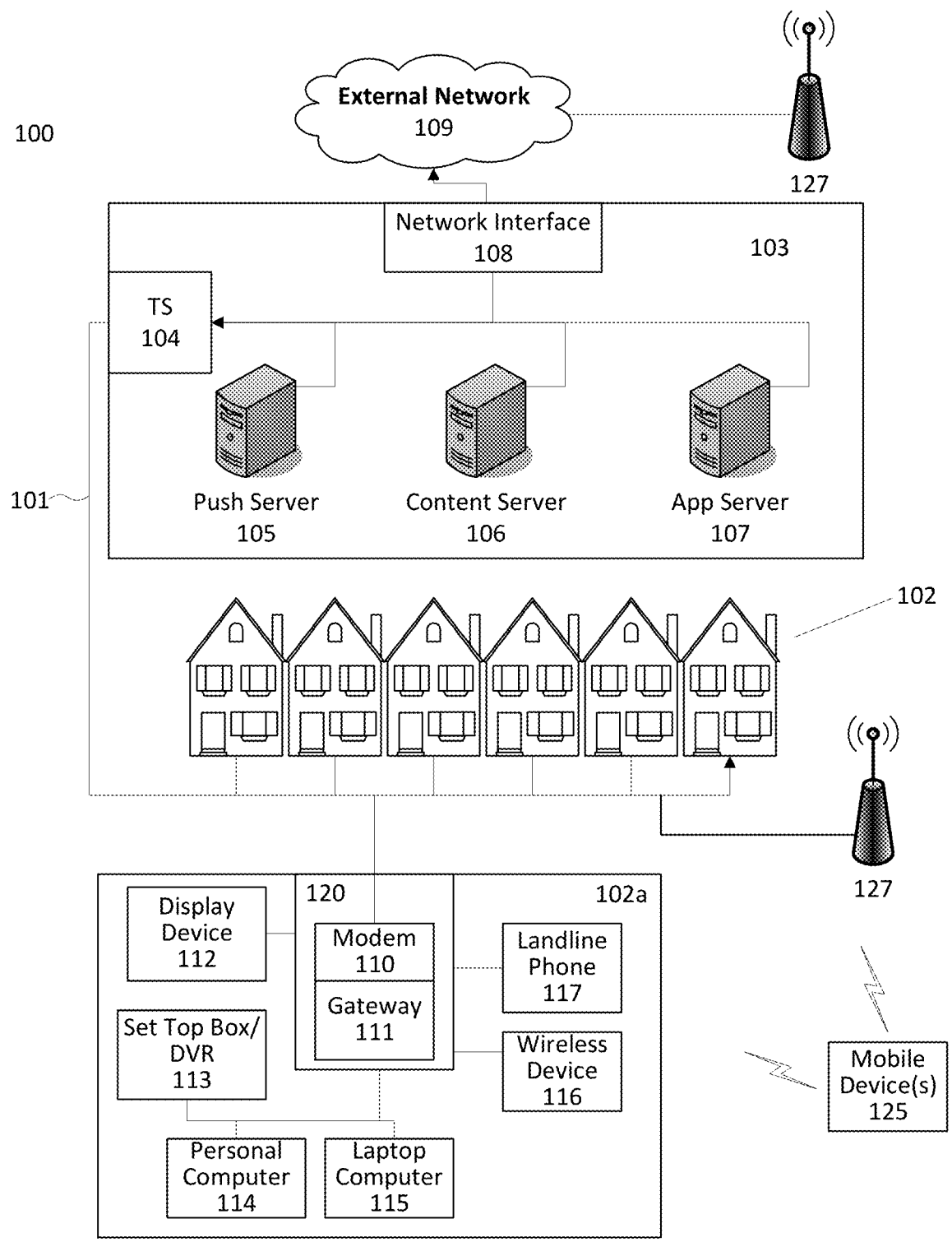
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured manage communications among those devices, to manage communications between those devices and backend devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being sent to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
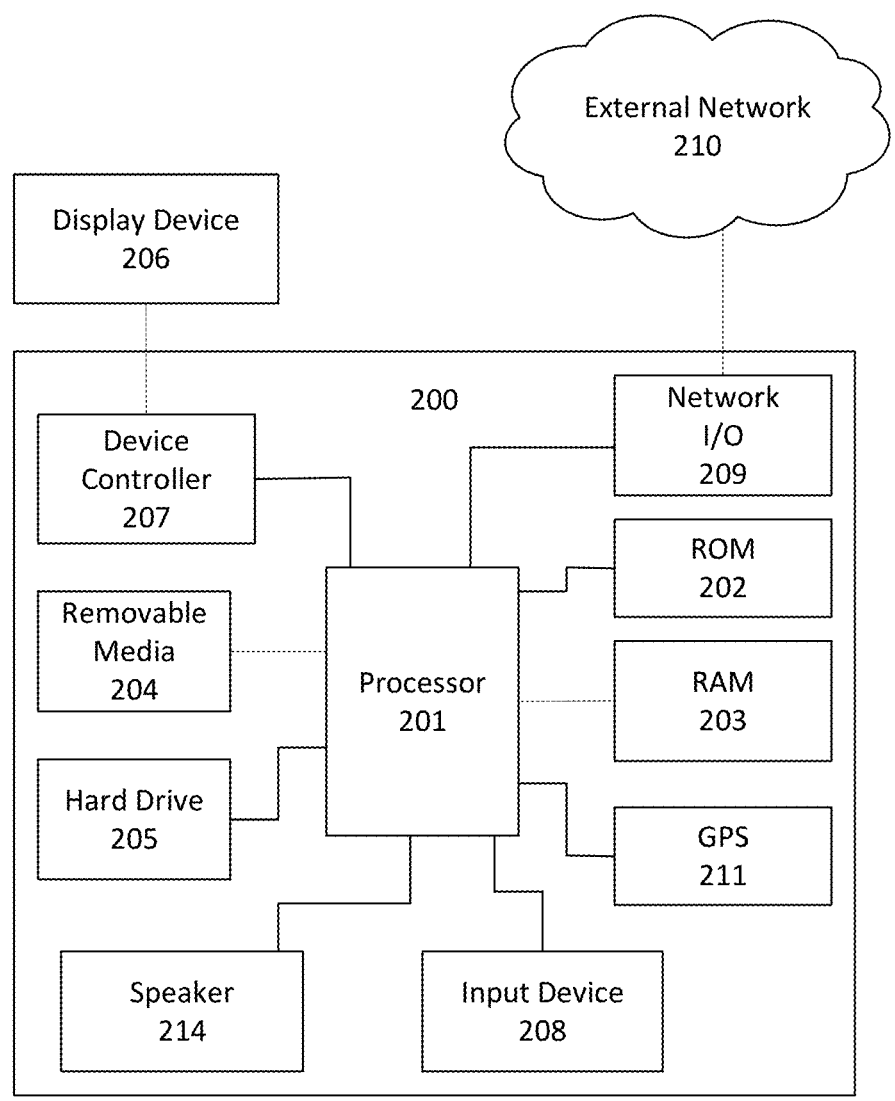
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., security controllers, security alarm systems, security surveillance systems). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The communication device 200 may comprise a location-detecting device, such as a global positioning system (GPS) microprocessor 211, which may be configured to receive and process global positioning signals and determine, with possible assistance from an external server and antenna, a geographic position of the communication device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. A memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. An IC may be configured to output image data to a display buffer.

The following may be a general overview of methods and/or systems for detecting abnormal activities within premises when a security system is turned off, or disarmed. If a security system is intentionally or mistakenly disarmed, the system may still monitor the premises. The system may send a security alert to users if an anomalous activity is detected, even if the system is disarmed. For example, if a user falls asleep at night without turning on a security system and an unusual activity is detected by, e.g., a back door sensor, on Monday at 2 am, it may be advantageous to at least notify the users, if not call authorities immediately.

A security system may maintain a state history of various security sensors (e.g., doors, windows, motion sensors, etc.). The state history may record sensor states (e.g., door open, door closed, motion detected, etc.) at different times throughout a time period of the history (e.g., second-by-second history for the past week, past month, past year, etc.), which may indicate one or more user behavioral patterns within the premises. For example, the state history may indicate that a back door is usually opened on Monday at around 8 am when a user goes to work. The state history may indicate that a front door is usually opened on Monday at 6 pm when the user returns to home. The security sensors' individual states (e.g., contact closed, contact open, degree of opening, motion detected, etc.) and/or transitions of those states (e.g., switching from open to closed) may be recorded within the state history.

By intelligently monitoring this state history, meaningful alerts may be provided to the user when an abnormal event occurs. The alerts may be based on several score values. One score may be based on a determination of how often a particular state change occurs at the current time. For example, if all doors and windows are closed, and then an upstairs window is opened at 10 pm on a Monday night in June, the system may use the state history to determine whether this state transition (from all doors/windows closed to having the upstairs window opened) is part of a routine pattern for the premises. Another score may be based on how common the new state is at that time. If the upstairs window is opened at 10 pm on that Monday night in June, the system may use the state history to determine whether having the upstairs window open at 10 pm (even if it were opened earlier than that) is a normal occurrence for the premises. If a current state transition is determined to be abnormal in view of the state history and scores discussed above, a security alert may be sent to users.

Figure 3:
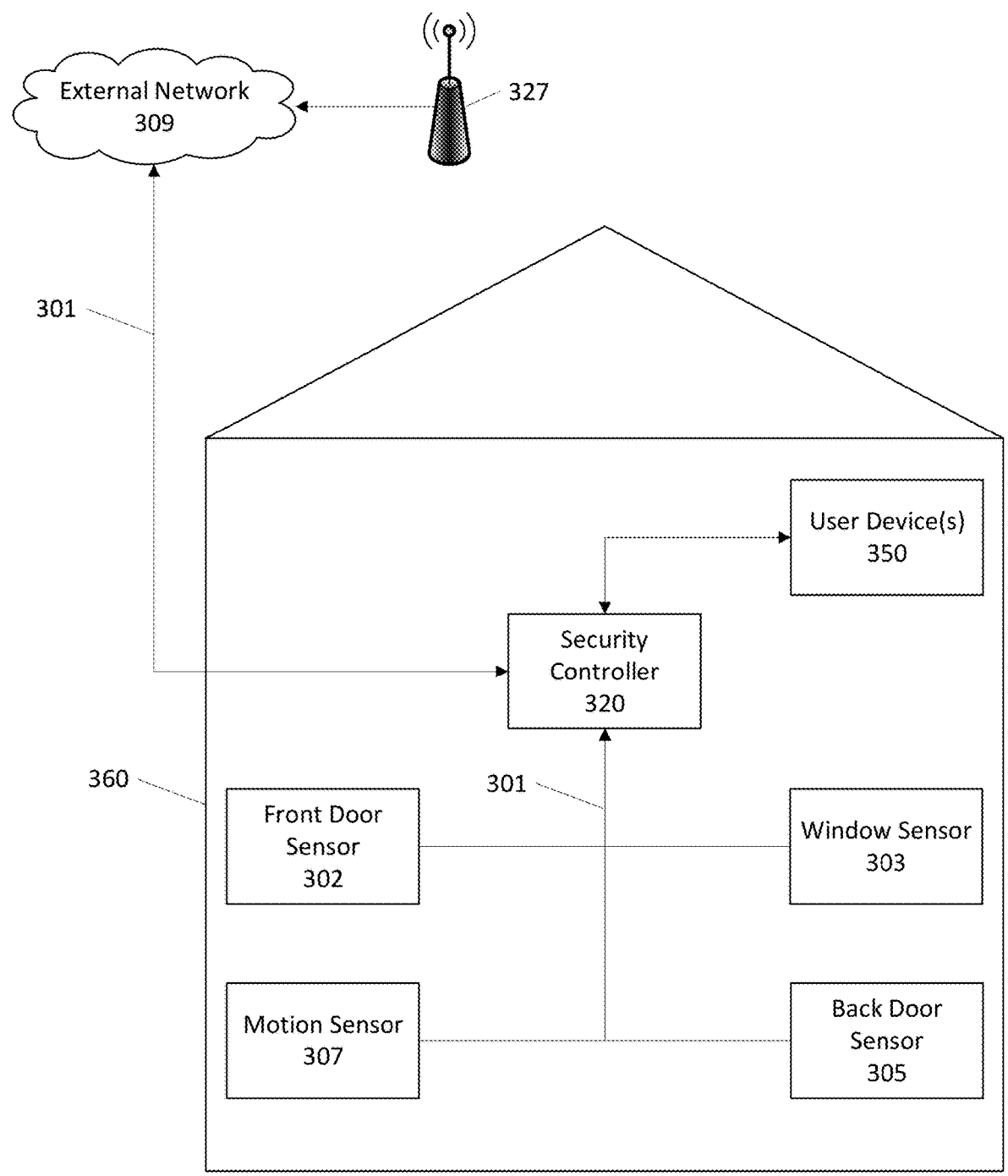
FIG. 3 shows an example configuration for a security system.

FIG. 3 illustrates an example configuration for a security system in which various features described herein may be performed and implemented. The security system may monitor premises 360 (e.g., the premises 102 or the local office 103 of FIG. 1), such as a user residence, business, recreational facility, etc. (referred to herein as a user residence or premises in a non-limiting manner). The security system may comprise a plurality of security sensors, such as a front door sensor 302, a window sensor 303, a back door sensor 305 and/or a motion sensor 307. The sensors 302, 303, 305, 307 may comprise, e.g., passive infrared motion detectors, ultrasonic detectors, microwave detectors, magnetic switches, photoelectric beams and/or glass break detectors. The security system may comprise a security controller 320 (e.g., the computing device 200 of FIG. 2). The controller 320 may receive, store, process and/or update the states of the various sensors. The controller 320 may be connected to the sensors 302, 303, 305, 307, user device(s) 350 (e.g., the display devices 112, the STBs or DVRs 113, the personal computers 114, the laptop computers 115, the wireless devices 116 or the mobile devices 125 of FIG. 1) and/or an external network 309 (e.g., the external network 109 of FIG. 1 or the external network 210 of FIG. 2), via communication links 301 (e.g., the communication links 101 of FIG. 1). The communication links 301 may be coupled to wireless access points 327 (e.g., the wireless access points 127 of FIG. 1).

In FIG. 3, the sensors 302, 303, 305, 307 may continue monitoring the premises 360, and the controller 320 may receive and/or process inputs from the various sensors, regardless of whether the security system is armed. If the system is armed, users may be notified immediately if a sensor is changed (e.g., if a door or window is opened). If the system is unarmed, the system may still actively monitor the premises 360, and may send out an anomalous activity alert to users if a current security event is determined to be abnormal.

For example, if a security system is unarmed and an intruder enters the premises 360, the motion sensor 307 may detect the intruder's motion, and the state of the motion sensor 307 may change from "no motion detected" to "motion detected." The sensors 302, 303, 305, 307 may continue reporting their current state or transition to the controller 320, and the controller 320 may continue updating the state history.

If a transition from an old sensor state to a new sensor state is detected (e.g., a door is opened), the security system may use the state history to determine whether an alert needs to be sent regarding the current state transition event. This may comprise determining a score that is based on several factors, and comparing the score to a predetermined threshold. One factor may be based on how common it is for the current state transition event (e.g., motion sensor going from "no motion detected" to "motion detected") at the current time period (e.g., time of day, day of week, day of month, combinations thereof, etc.). Another factor may be based on how common it is for the security system sensors to be in the new state (e.g., all doors and windows closed, but motion detector sensing motion) at the current time period. This may be generally represented using the following:

$$S_{TOTAL} = S_{TRANSITION} + S_{STATE}$$

$S_{TOTAL}$ may represent a total score for the current state transition event (e.g., opening of a particular door changes the state of the door sensor from closed to open).

$S_{TRANSITION}$ may represent a score that is based on a determination of how normal the current state transition is for a current time period in the state history (e.g., how common it is for that particular door to transition from closed to open states at this particular time). $S_{STATE}$ may represent a score that is based on a determination of how normal the new state (door in a closed state) is for the current time period in the state history.

A particular state transition event may be deemed abnormal if its $S_{TOTAL}$ satisfies a particular threshold score (e.g., if $S_{TOTAL}$ falls below 0.05).

Based on these and other factors, the current event may be determined to be abnormal, and a security alert may be sent to the user device 350.

Figure 4A:
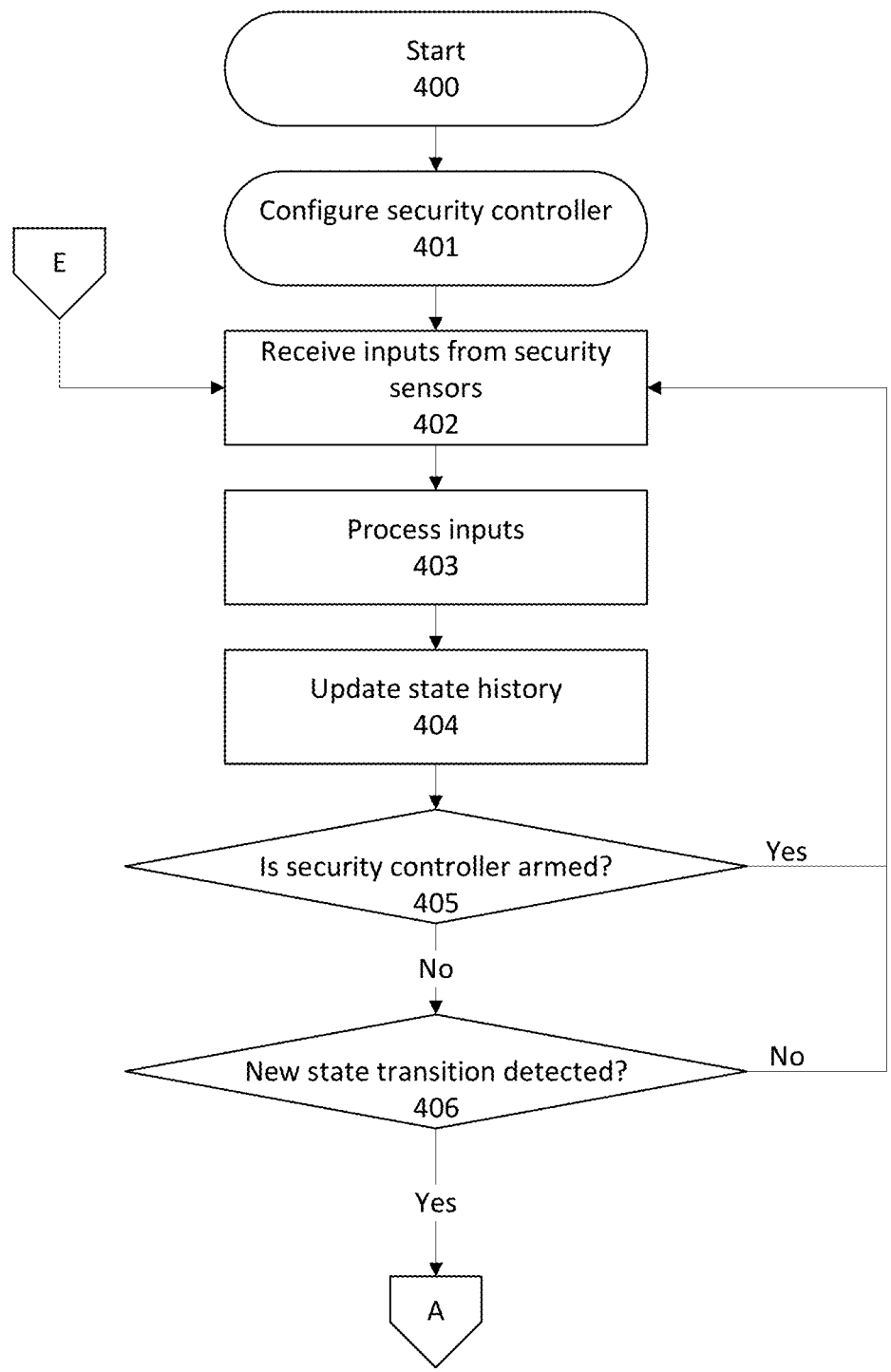
FIGS. 4A to 4E show flowcharts showing example methods for detecting abnormal events at premises by a security system.

FIGS. 4A to 4E show example methods for detecting abnormal events at premises by a security system. The steps may be performed, for example, by the security controller 320, although user device 350, remote device, a remote device via network 309, or any other device may be used additionally or alternatively. In FIG. 4A, at step 401, a configuration may be performed. The configuration may comprise downloading software, applications and/or instructions from an external server (e.g., the push server 105, the content server 106 and/or the app server 107), via the external network 309 or the wireless access points 327. The configuration may comprise receiving users' preferences regarding an alarm or notification from the external server. At step 402, inputs may be received from the various sensors, e.g. the sensors 302, 303, 305, 307. The sensors may send their states (e.g., contact closed, contact open, degree of opening, motion detected, etc.) and/or transitions of the states to the controller 320. As previously discussed, the controller 320 may continue monitoring the premises 360 and receiving the states from the various sensors, even if the security system is disarmed.

At step 403, the inputs from the various sensors, such as, e.g., the sensors 302, 303, 305, 307, may be processed and/or stored. In the inputs, new states and/or transitions of, e.g., the sensors 302, 303, 305, 307 may be indicated. Raw data may be received from the various sensors, and the inputs may be trimmed, filtered, or reorganized. For example, a sensor 302 report may include an indication of a battery level at the sensor 302, and if the battery level is too low (e.g., below a minimum threshold voltage level), the report from that sensor 302 may be discarded or otherwise marked as suspect. A suspect report could be ignored as unreliable, or subject to further verification (e.g., via another report). The controller 320 may regroup or reorder the new states and/or transitions based on their recorded time and dates. The inputs from the sensors may be encoded into linked lists or other digital formats. The inputs from the sensors may be stored as a time-series sequence.

At step 404, the state history of the various sensors, e.g. the sensors 302, 303, 305, 307, may be updated. The state history may be stored in memory of the controller 320 (e.g., the read-only memory (ROM) 202, the random access memory (RAM) 203, or the removable media 204 of FIG. 2) and/or an external server (e.g., the content server 106 of FIG. 1). FIG. 5 shows an example of information in the state history. In the FIG. 5 example, the sensors 302, 305, 307 may correspond to a front door sensor 302, back door sensor 305, and motion sensor 307. The sensors 302, 305, 307 may provide either a state "0" or a state "1" depending on whether the contact switch is open or closed (or in the case of the motion detector, if motion is detected). The "0" and "1" may be status labels. For example, the state "0" may show that a door is closed or no motion is detected. The state "1" may show that a door is opened or a motion is detected. In the state "0" of a door or window sensor, a door or window may be closed. In the state "1" of the door or window sensor, the door or window may be opened.

In FIG. 5, a first state 510 may have been reported by the sensors 302, 305, 307 at time 12:00:00 on Monday of Week 4. That first state 510 may indicate that, at the time of the first state, the front door is closed (e.g., sensor 302 reports a '0'), the back door is closed (e.g., sensor 305 reports a '0'), and no motion is detected (e.g., sensor 307 reports a '0'). A second state 520 (e.g., one second later at time 12:00:01) may indicate a different sensor state. The second state 520 may report the same values for the front door and motion sensor, but the back door sensor 305 has reported that it is open (e.g., sensor 305 reports a '1'). The first state 510 value of '000' is different from the second state 520 value of '010', so the system may determine that a security sensor state transition has occurred. The new state of the sensors may have been caused by a current security event, such as the opening of the back door as detected by the back door sensor 305.

Each of the states 510, 520, 530 and 540 in FIG. 5 may represent the states of the sensors 302, 305, 307 at a particular time. The states may be continuously monitored, and the security sensor states may be stored periodically according to a schedule (e.g. every second, every minute, etc.). The states may also (or alternatively) be stored when there is a change in the state of one or more of the sensors 302, 305, 307 (e.g., if entries are normally stored every second, and a door is opened 0.5 seconds after the last entry, a new entry may be added immediately instead of waiting for the next scheduled entry). In the FIG. 5 example, the last column may show a time for the reported states.

The states 510, 520, 530, 540 may be encoded in various data structures such as linked lists. For example, encoding inputs from security sensors may be performed by the controller 320. The state history may be continuously updated when the controller 320 receives inputs from security sensors. The state history may be stored in memory of the controller 320 (e.g., the read-only memory (ROM) 202, the random access memory (RAM) 203, or the removable media 204 of FIG. 2). Alternatively, raw inputs from security sensors (e.g., a voltage level, a distance measurement, etc.) may be transferred to an external server (e.g., the content server 106 of FIG. 1) through the external network 309. Or, the sensors may send encoded inputs that provide a simple state value (e.g., closed or open). The state history may be updated by supplying raw inputs or encoded inputs to an external server. The controller 320 may save memory space or computational power by simply storing the state value instead of the raw inputs. Also, the controller 320 may depend on an external server in filtering, processing, or encoding incoming inputs from security sensors.

At step 405, the security system may determine whether it is in an armed state. If it is in an armed state, users may be notified of the change in security sensor state without requiring a determination as to whether the change is normal. However, the controller 320 may continue receiving inputs from the various sensors (e.g., in step 402) and updating the state history. If, in step 405, the security system is in an unarmed state (e.g., step 405: no), the system may determine at step 406 whether the current security sensor state has changed from a previous state to a new state (e.g., a door sensor has indicated an open state whereas a prior report indicated a closed state, a motion sensor has registered motion whereas a prior report did not register motion, etc.), indicating that a state transition of the sensors has occurred (e.g., step 406: yes). If a state transition has been detected, then in step 407 (FIG. 4B) a portion of the security sensor state history may be retrieved for purposes of determining whether the state transition is abnormal.

At step 407, the controller 320 may retrieve a portion of the state history for a given time frame such as, e.g., one hour, one day, four weeks, one year, etc., based on the current state transition, to permit the determination of whether the current state transition is abnormal. The time frame may be any desired time frame in which the state transition is likely to be repeating. For example, many actions occur daily (e.g., opening the door to get the newspaper at 5 am, going to work at 7 am, etc.), hourly (e.g., retrieving firewood in winter months), monthly (e.g., reading a utility meter for monthly billing purposes), or at other regular intervals, and the retrieved portion of the state history may encompass a number of these intervals sufficient to identify repeating patterns. Users may show a similar schedule or life style on each day, week or month.

FIG. 6 shows an example of such a retrieved portion of the state history. In FIG. 6, a current transition 601 has been detected on a Monday at 16:00. In that current transition 601, the security sensor state changed from '001' to '011,' which may indicate that the back door has opened. After detecting this current transition 601, state history information for the four most recent Mondays, in a time range surrounding the time of the current state transition 601 (e.g., 12:00 to 20:00), may be retrieved.

In FIG. 6, sensor states 602-605 in the state history are illustrated for the four most recent Mondays, and in a time range surrounding the time of the current state transition. FIG. 6 also highlights several state transitions 606-608 that match the current state transition (e.g., other times at which the state also changed from '001' to '011'). Those matching state transitions may be used to help determine whether the current state transition is abnormal.

Several scores may be determined based on the current transition 601 and the retrieved portions of the state history. A transition score ($S_{TRANSITION}$) may indicate a degree to which the particular transition has occurred at the same or similar times in the state history, and a new state score ($S_{STATE}$) may indicate a degree to which the new state following the transition is normal at the same or similar times in the state history. The $S_{TRANSITION}$ may be determined in steps 408 to 413 of FIG. 4B, and the $S_{STATE}$ may be determined in steps 414 to 419 of FIG. 4C. Based on the transition score ($S_{TRANSITION}$) and the new state score ($S_{STATE}$), it may be determined whether the controller 320 should send out an anomalous activity alert to users.

Figure 7A:
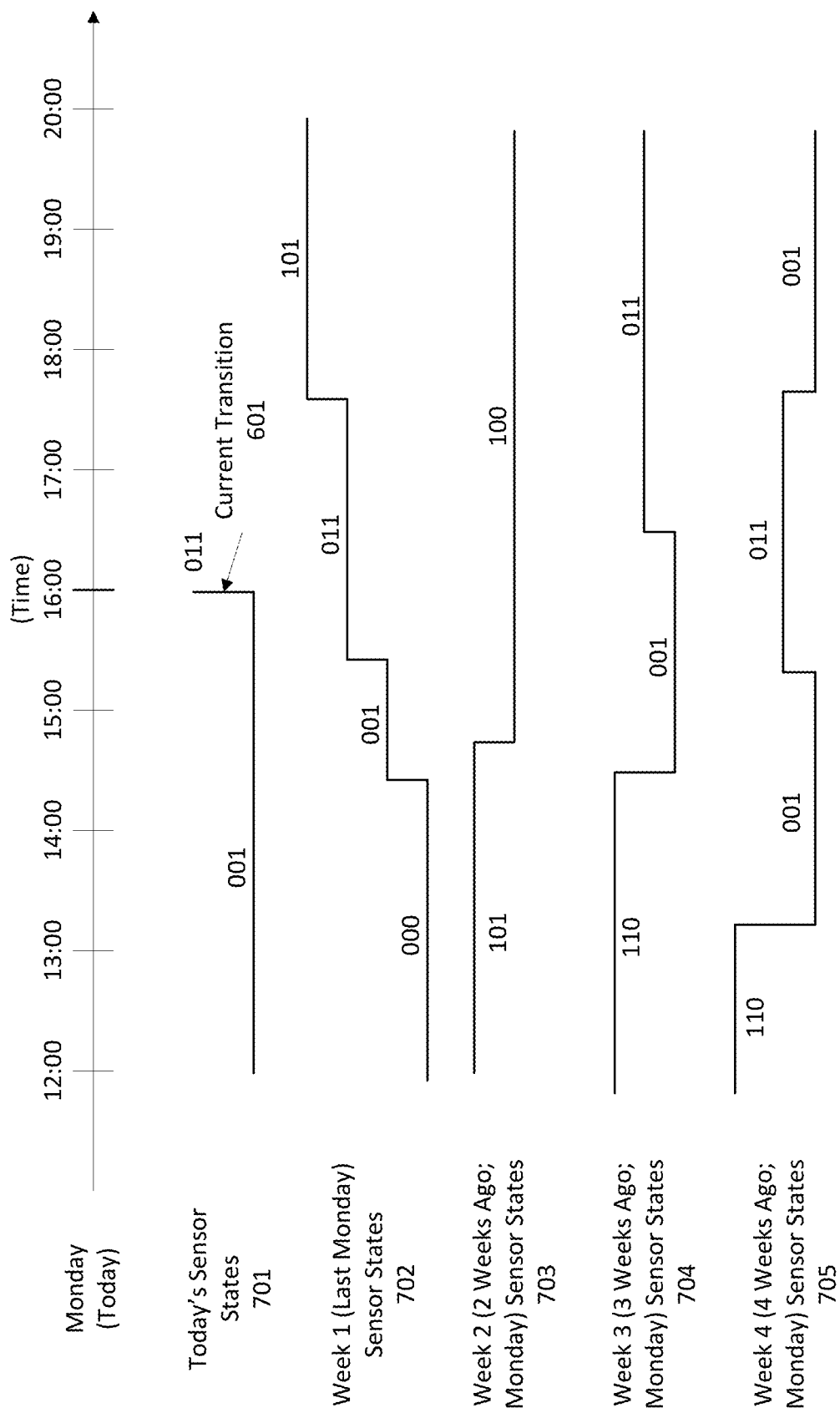
Figure 7C:
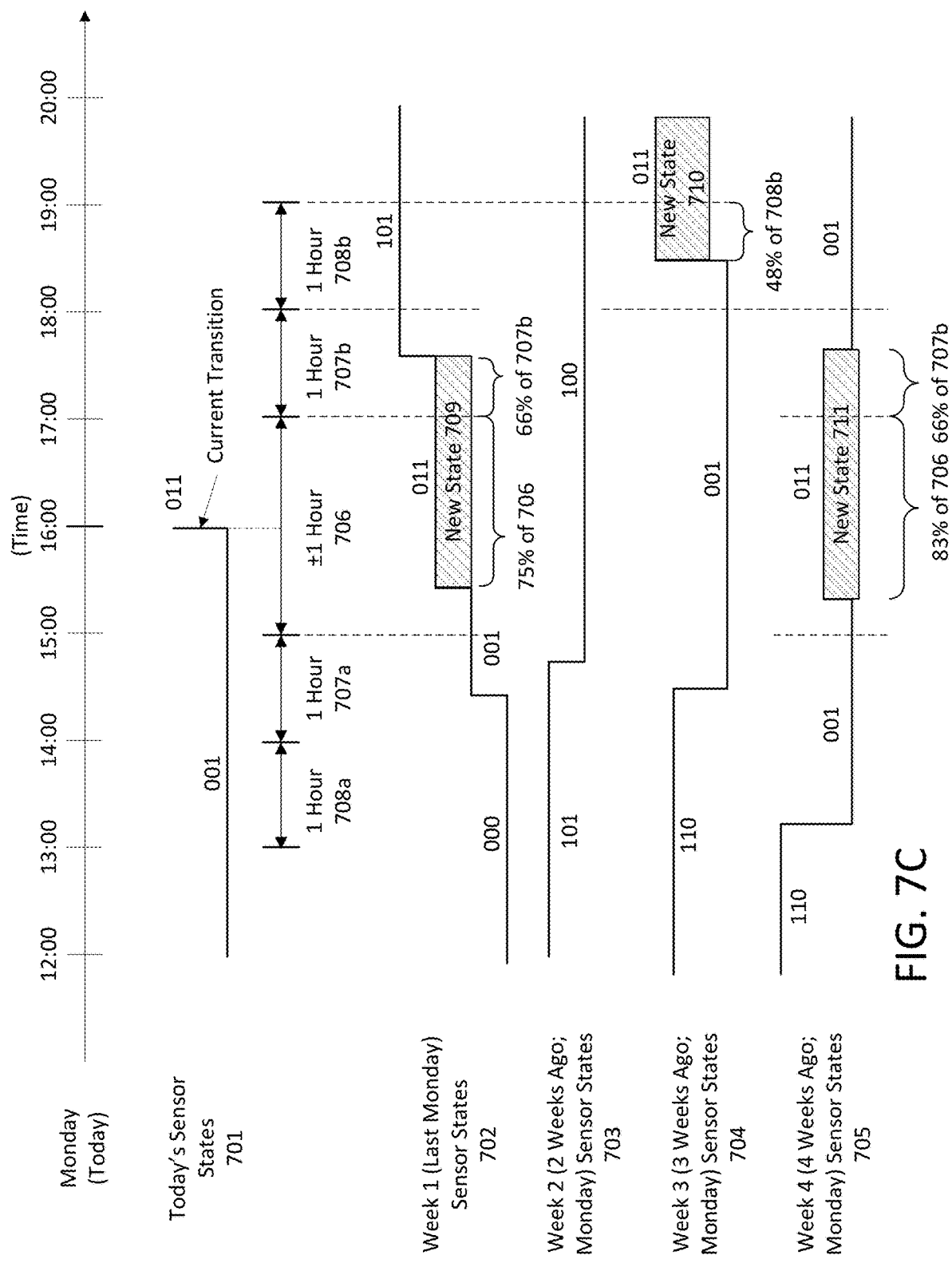

At step 408, a determination may be made as to whether the retrieved portions of the state history (e.g., the 4 past Mondays from 12:00 to 20:00) comprise the current state transition 601 of FIGS. 6 to 7C. If the current state transition 601 is found in the state history (e.g., step 408: yes), the controller 320 may proceed to step 409. If the current state transition 601 is not found in the state history (e.g., step 408: no), the controller 320 may proceed to step 414. Example methods of determining the transition score ($S_{TRANSITION}$) and new state score ($S_{STATE}$) will be discussed in further detail with reference to FIGS. 4B & 4C, and based on the example timelines of FIGS. 7A to 7C.

The FIG. 7A timelines illustrate the sensor state information from FIG. 6, but in a timeline form to illustrate how the repeating time portions and sensor states may correspond. A current sensor state timeline 701 may indicate the measured states of the various security sensors, and the current state transition 601 (changing from '001' to '011') is shown occurring at 16:00 (as discussed above and shown in FIG. 6). Similarly, the data for the most recent Monday in Week 1 (1 week ago) 602 is shown in timeline 702. The data for Monday in Week 2 (2 weeks ago) 603 is shown in timeline 703; the data for Monday in Week 3 (3 weeks ago) 604 is shown in timeline 704, and the data for Monday in Week 4 (4 weeks ago) 605 is shown in timeline 705.

Figure 4B:
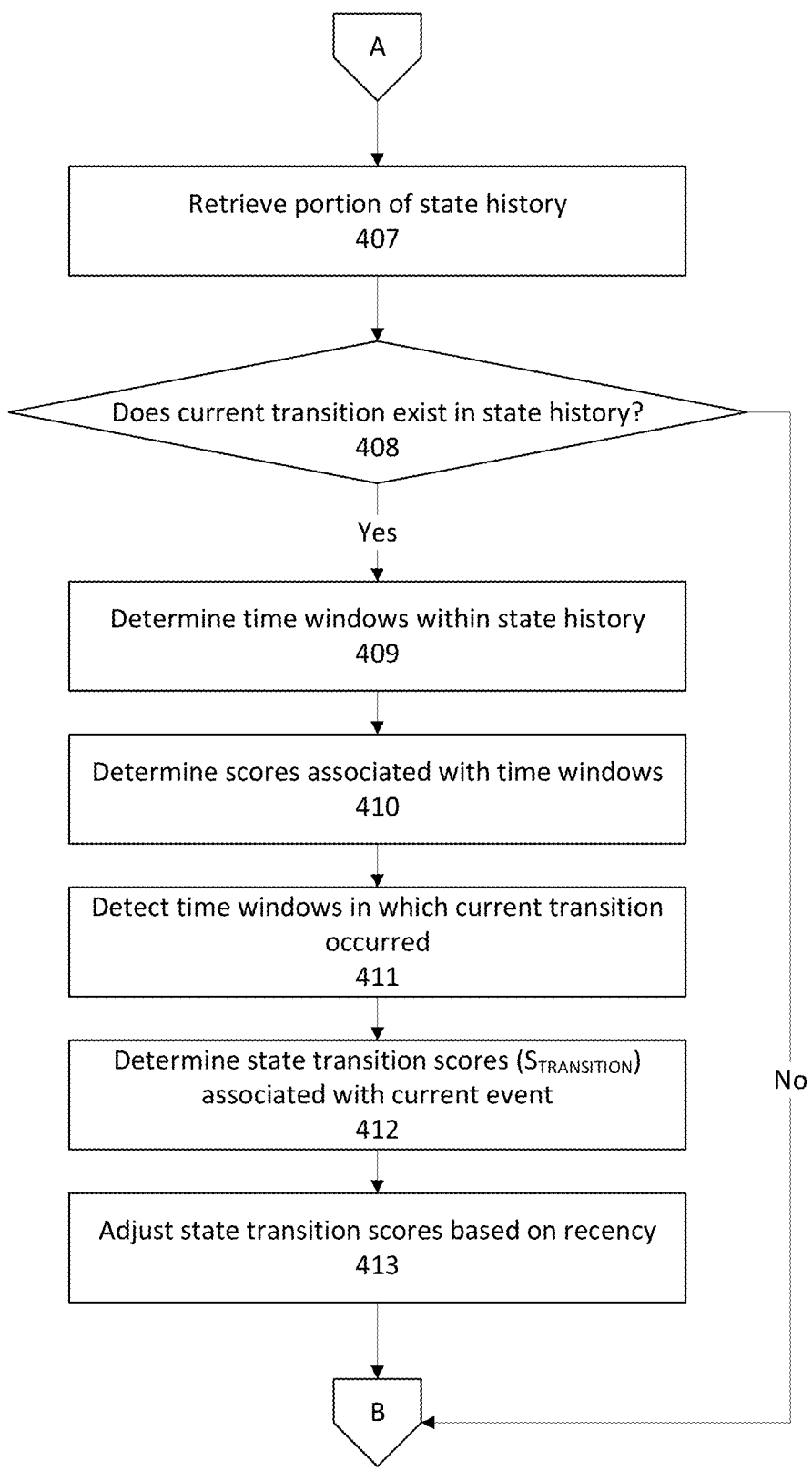

FIG. 7B illustrates the same timelines 701-705, and in step 409 of FIG. 4B, time windows may be determined for use in determining the state transition score ($S_{TRANSITION}$). The state transition score may indicate how common this particular state transition is, at this particular time, in the state history. If the same transition had occurred at exactly the same time in the state history (e.g., the same door was opened last Monday at 16:00 as well), then that matching transition in the history is good evidence that the current transition is normal. If a matching transition happened at a similar time that was not exactly the same (e.g., the same door was opened last Monday at 16:30, and not 16:00), then that matching transition may still suggest that the current transition is normal, but to a lesser degree than if the matching transition had occurred at exactly the same time. The time windows may be used to reflect this. In FIG. 7B, the first time window 706 may be centered at the time of the current state transition (16:00), and extends an hour before and an hour after (e.g., 15:00-17:00). If a matching transition is found to have occurred within this first time window, then a relatively high state transition score S1 may be given to that matching transition, increasing the likelihood that the current transition is normal. The second time window may be in two parts, 707a (e.g., 14:00-15:00) and 707b (e.g., 17:00-18:00), which are an hour on either side of the first time window 706. If a matching transition is found in the second window, then a lower state transition score S2 may be given to the matching transition. The third time window may also be in two parts, 708a (e.g., 13:00-14:00) and 708b (e.g., 18:00-19:00), which are an hour on either side of the second time window. A matching transition in the third time window may be given an even lower state transition score S3. Additional and/or alternative time windows may be chosen, depending on particular user patterns and preferences.

At step 410, different scores may be determined for the different windows. The values for these scores may be, for example, the following:

S1=1.0;
S2=0.5; and
S3=0.333

Matching transitions that occur outside of the windows, or no matching transitions, may yield a score of 0.0. Of course, the windows and scores given above are just examples, and other values may be used as desired.

In step 411, the retrieved portion of the state history may be examined to determine whether any matching state transitions are found. Using the example of FIG. 7B, there are three matching state transitions in which the security sensor state made the same transition (from '001' to '011") as the current transition. The first matching state transition 606 is in timeline 702 (last Monday), and occurred within the first window 706. The second matching transition 607 is in timeline 704 (3 weeks ago, Monday), and occurred in third window 708b. The third matching transition 608 is in timeline 705 (4 weeks ago, Monday), and occurred in the first window 706. In the example, there happened to be no matching transitions on the Monday 2 weeks ago (timeline 703).

In step 412, and using the example window scores above, the following state transition scores ($S_{TRANSITION}$) may be assigned for the 4 prior Mondays:

Last Monday—matching transition 606 (first window)= S1=1.0;
2 Weeks ago—no matching transitions=0.0
3 Weeks ago—matching transition 607 (third window)= S2=0.333; and
4 Weeks ago—matching transition 608 (first window)= S1=1.0

In step 413, the state transition scores may be adjusted based on their recency. In general, if a matching state transition occurred recently (e.g., last week), then that matching state transition may be a strong indicator of the normality of the current state transition. If a matching state transition occurred in the more distant past, then that older matching state transition may be a weaker indicator of the normality of the current state transition. The state transition scores may be adjusted in step 413 to account for this difference. To do so, a weighting factor W may be determined based on the total number of weeks N that were retrieved. For example, state transition data from four weeks are shown in FIG. 6. With N=4, the weight W may be determined based on the following:

$$W + \frac{W}{2} + \frac{W}{3} + \frac{W}{4} + \ldots + \frac{W}{N} = N$$

$$W + \frac{W}{2} + \frac{W}{3} + \frac{W}{4} = 4$$

$$W = 1.92$$

The state transition score for any given week may be adjusted by a factor of:

$$\frac{W}{\text{\# Weeks Ago}}$$

So, using the example above, the score for last Monday was 1.0, and since last Monday was one week ago, that adjusted score ($S_{TRANSITION(WEEK\ 1)}$) would be as follows:

(1.0)*1.92/1=1.92

The score for the Monday 3 weeks ago was 0.333, and the adjusted score ($S_{TRANSITION(WEEK\ 3)}$) would be as follows:

(0.333)*1.92/3=0.21

The score for the Monday 4 weeks ago was 1.0, and the adjusted score ($S_{TRANSITION(WEEK\ 4)}$) would be as follows:

(1.0)*1.92/4=0.48

These adjusted state transition scores ($S_{TRANSITION}$) may be used in conjunction with new state scores ($S_{STATE}$), described below with reference to FIG. 7C. FIG. 7C illustrates the same timelines as FIGS. 7A & 7B, but with different windowing data.

In step 414, a determination may be made as to whether the retrieved portions of the state history (e.g., the 4 past Mondays from 12:00 to 20:00) comprise any portions in which the security sensor state matched the new state. So, for example, the current state transition 601 changed from '001' to '011', so the new state is '011.' As illustrated in FIG. 7C, that new state is found in three instances in the retrieved portion of the state history. A first new state portion 709 is found in last Monday's timeline 702, a second new state portion 710 is found in the timeline 704 (Monday 3 weeks ago), and a third new state portion 711 is found in the timeline 705 (Monday 4 weeks ago).

Steps 415 and 416 may be the same as steps 409 and 410, and the same windows and initial values S1, S2, and S3 may be used.

In step 417, the state history may be examined to identify the portions in which the security sensor state matched the new state after the current state transition. As discussed above in step 414, the new state portions 709-711 may be identified in this step.

In step 418, fractional portions of the durations of windows 706-708b may be determined based on the durations of new state portions 709-711. The fractional portions may indicate a percentage of each window that is occupied by the new state portion. For example, new state portion 709 occupies 75% of window 706 and 66% of window 707b. New state portion 710 occupies 48% of window 708b. New state portion 711 occupies 83% of window 706 and 66% of window 707b.

In step 419, and similar to step 412 of FIG. 4B, weekly new state scores may be determined for the retrieved portion of the state history (e.g., the 4 weeks shown in FIGS. 6-7C). For each Monday in the retrieved portion of the state history, the fractional portions determined in step 419 may be applied to the corresponding window values (S1, S2, S3) for the windows that were occupied on that day, and their values summed to obtain a new state score for that day. So for example, new state portion 709 occupied 75% of window 706 and 66% of window 707b. The window value for window 706 (discussed above) is S1=1.0, and the window value for window 707b is S2=0.5. So the new state score for last Monday would be as follows:

(75%)*(1.0)+(66%)*(0.5)=1.08

The new state score for the Monday 3 weeks ago (timeline 704) would be as follows:

(48%)*(0.333)=0.16

The new state score for the Monday 4 weeks ago (timeline 705) would be as follows:

(83%)*(1.0)+(66%)*(0.5)=1.16

The new state score for the Monday 2 weeks ago, which had no time in the new state, would simply be zero.

In step 420, the new state scores may be adjusted based on recency, using the same factors discussed in step 413. At this point, state transition scores and new state scores may have been determined for each of the previous Mondays. In step 421, these scores may then be summed to arrive at a total score ($S_{TOTAL}$) Using the examples above, the total would be:

1.92+0.21+0.48+1.08+0.16+1.16=5.01

Figure 4C:
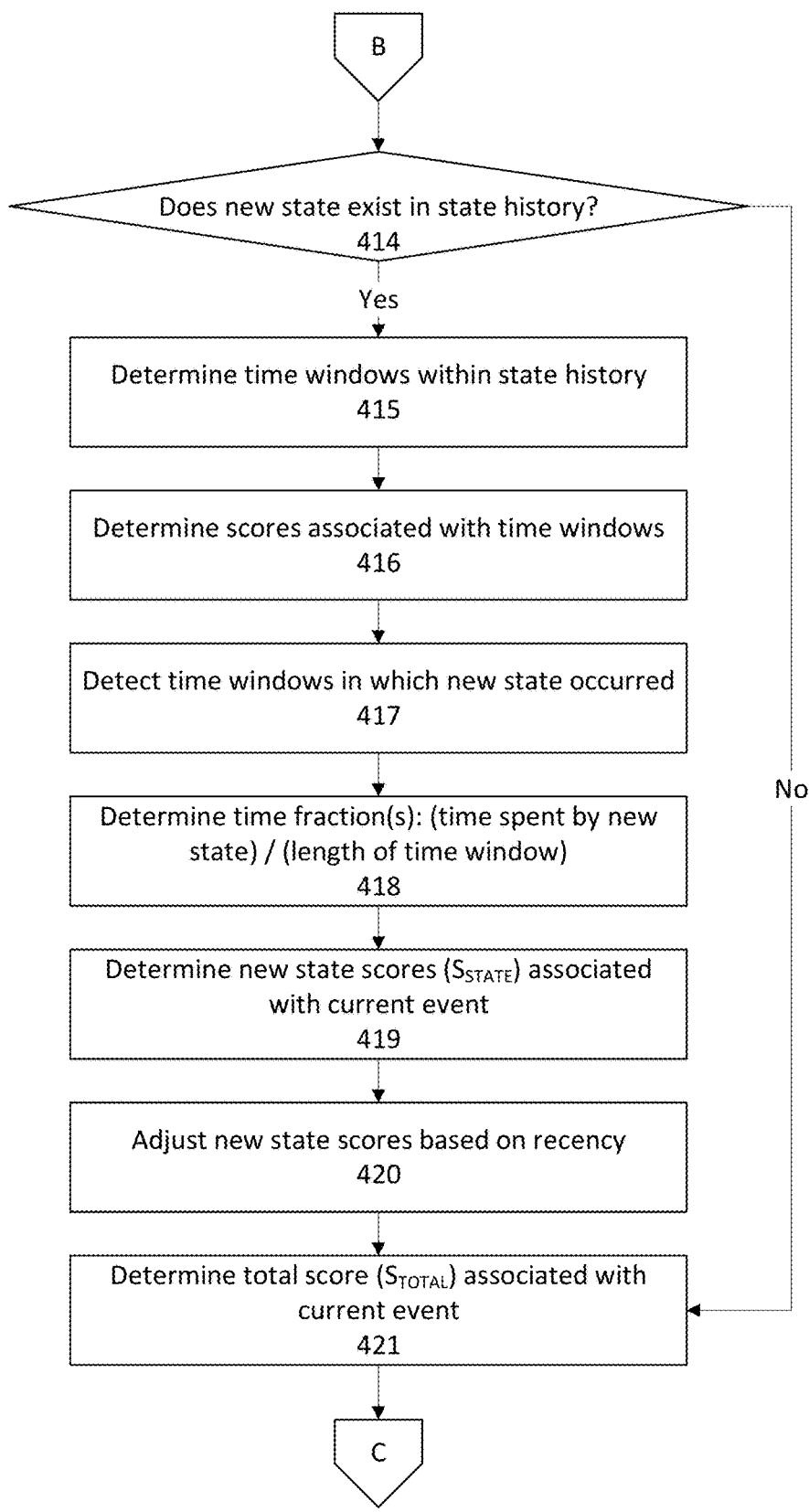
Figure 4D:
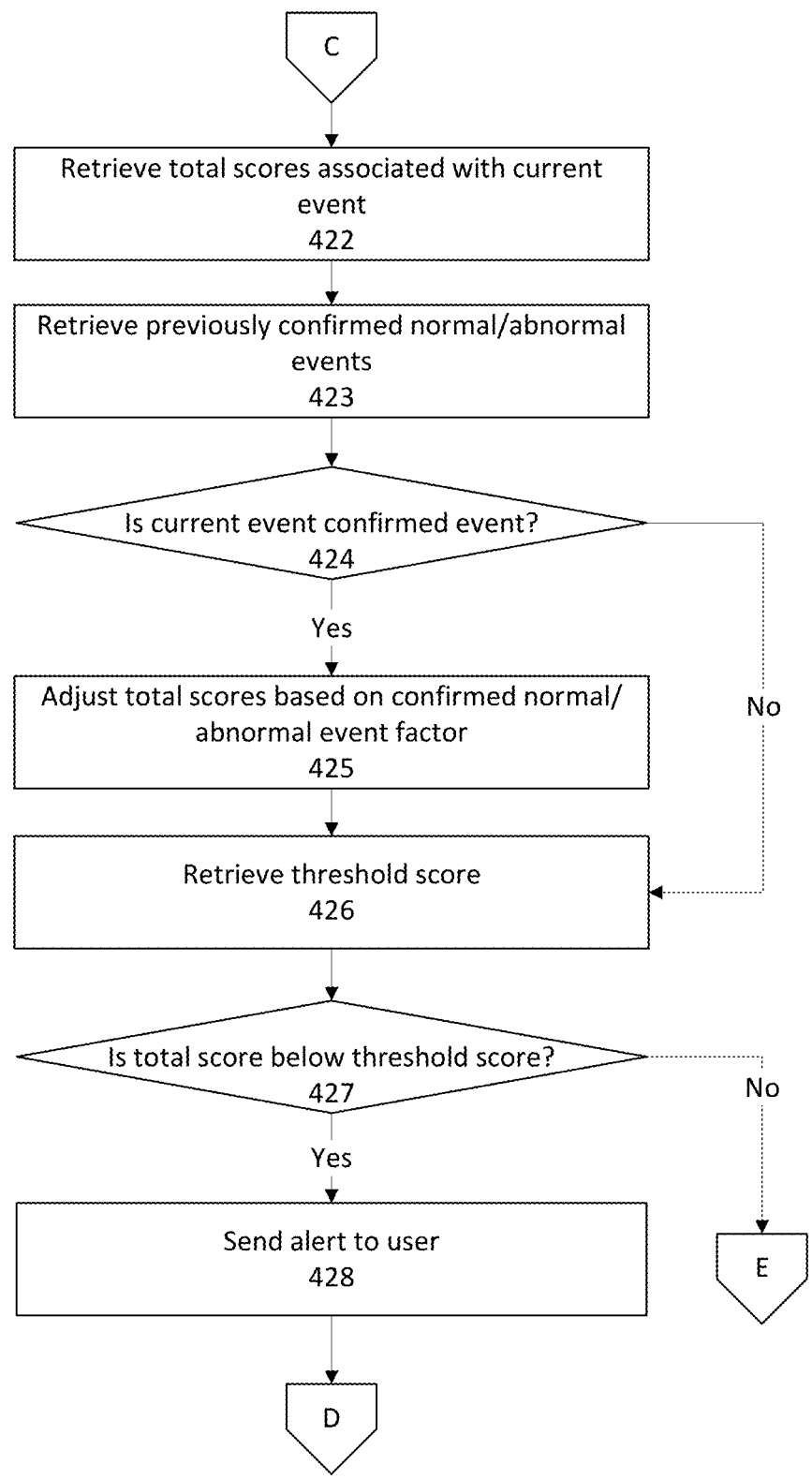
Figure 4E:
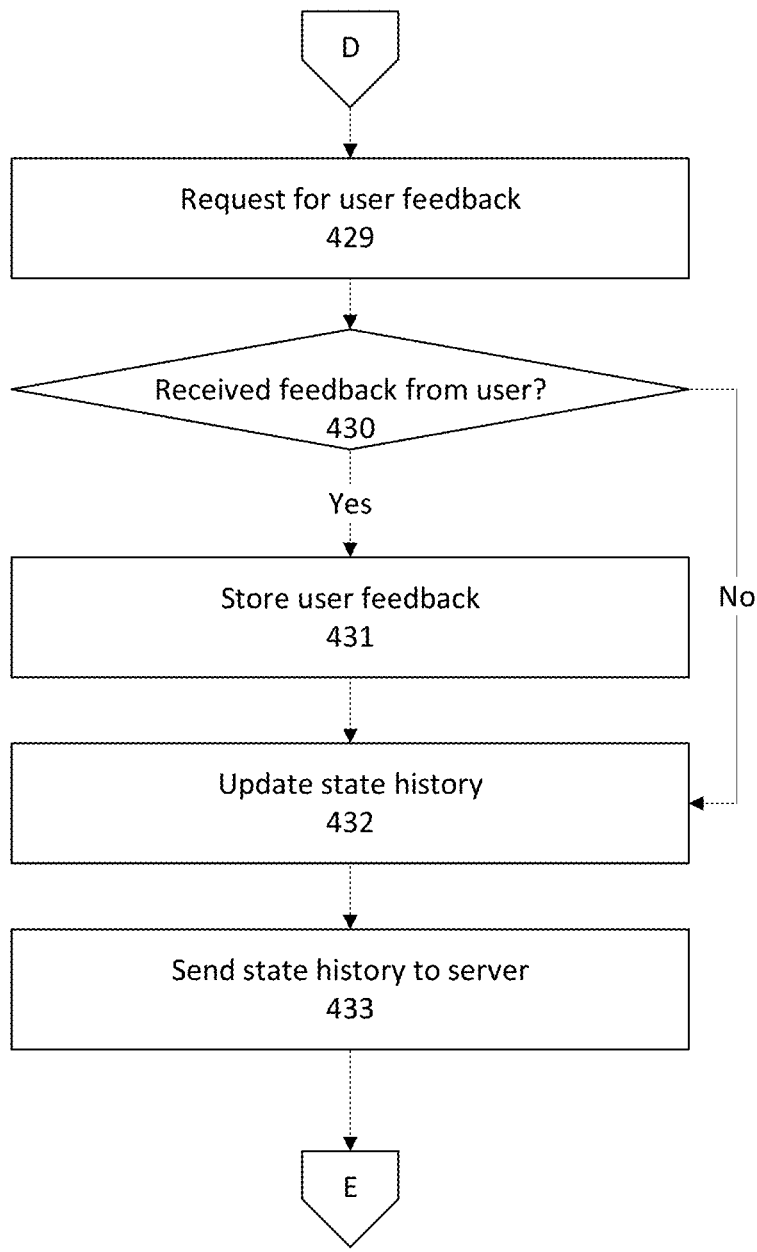

FIGS. 4D & 4E illustrate example methods of determining whether to send a security alert to users of the system based on the total score as determined, e.g., in step 421 of FIG. 4C. At step 422, the total score may be retrieved from, e.g., memory of the controller 320 or an external server.

At step 423, information indicating confirmed normal or abnormal events may be retrieved. For example, users may participate in adjusting a security score for the same event repeating in future by providing a confirmation of normality or abnormality of the current event. If the same event repeats, a score for the event may be adjusted based on the previous user confirmation on the event's alleged normality or abnormality. The controller 320 or an external server may store the confirmation. Step 423 may be performed before the process of determining the total score for the current event, e.g., in step 421 of FIG. 4C.

As an example, if the back door of the premises 360 may be open on a Monday at 16:00, the system may initiate determining a security score as previously discussed in FIGS. 4A to 4C. The system may also detect, a few weeks ago, the same event occurred at around the same time on a Monday and an alert was sent to the user. The user may have responded to the alert by confirming the normality or abnormality of the event. Alternatively, the user may not provide a confirmation or ignore the alert. If the system detects a previous user feedback as to the normality or abnormality, it may be stored and used to adjust a score for the current event, e.g., on a Monday at 16:00.

At step 424, it may be determined whether the current event has been confirmed normal or abnormal by a previous user who had received an alert of the same event and provided a user feedback. If the event had been confirmed normal or abnormal (e.g., step 424: yes), the controller 320 may proceed to step 425. On the other hand, if the event is not confirmed normal or abnormal (e.g., step 424: no), the controller 320 may proceed to step 426.

If the user had previously confirmed that the same event is normal, the score for the current event (e.g., as determined in step 421) may be raised by, e.g., a confirmed normal event factor ($\alpha_{confirmed-normal}$). On the other hand, if the user had previously confirmed that the same event is abnormal, the score for the current event may be lowered by, e.g., a confirmed abnormal event factor ($\beta_{confirmed-abnormal}$). Example methods of adjusting the current score based on user feedbacks will be discussed in further detail below.

At step 425, the current score may be adjusted based on the confirmed event factors (e.g., $\alpha_{confirmed-normal}$ and $\beta_{confirmed-abnormal}$). The total score for the current event may be 5.01, e.g., as in step 421. If $\alpha_{confirmed-normal}$ is 3 and the event had been previously confirmed normal, an adjusted score for the event may be 5.01+3=8.01. On the other hand, if $\beta_{confirmed-abnormal}$ is 5 and the event had been previously confirmed abnormal, an adjusted score for the event may be 5.01−5=0.01. Here, the factor $\beta_{confirmed-abnormal}$ may be greater than the factor $\alpha_{confirmed-normal}$, since it may be more critical to alert users if the current event had been designated as being abnormal, rather than being normal. The factors may be adjusted by users and security service providers.

At step 426, a threshold score may be retrieved from, e.g., memory of the controller 320 or an external server. If the score for the current event (e.g. as determined in step 424 or 425) is below the threshold score, the current event may be abnormal and an alert may be sent to the users. An example threshold score may be 0.05, which may be adjusted by users and security service providers. The threshold score may be varied at different times. For example, users may employ a lower threshold score at night than during daytime, since users may feel more vulnerable at night, and may be more interested in receiving an alert from the system. In this disclosure, as previously discussed, users may receive an alert from the system if the current event is deemed abnormal, even though the system is turned off or unarmed.

At step 427, it may be checked whether the score for the current event is below the threshold score. If the score is below the threshold score (e.g., step 427: yes), the current event may be abnormal and the controller 320 may proceed to step 428. If the score is equal to or above the threshold score (e.g., step 427: no), the current event may be normal and an alert may not be sent. In this case, the controller 320 may proceed to step 402 and continue receiving inputs from the sensors.

The following are different scenarios for determining whether the total score is below the threshold score at step 427, depending on whether the current event is confirmed normal, abnormal, or not confirmed.

If the current event had been previously confirmed normal, the adjusted score for the event as determined in step 425 may be 8.01, which is greater than the threshold, 0.05 (e.g., step 427: no). In this case, the current event may be deemed normal and an alert may not be sent. The controller 320 may proceed to step 402 and continue receiving inputs from the sensors.

If the current event had been previously confirmed abnormal, the adjusted score as determined in step 425 may be 0.01, which is lower than the threshold, 0.05 (e.g., step 427: yes). In this case, the current event may be deemed abnormal. The controller 320 may proceed to step 428 and an alert may be sent to, e.g., authorities, security service providers, or designated individuals. As previously discussed, even if the system may be currently unarmed (e.g., step 405: no), it may be advantageous to alert the users.

If the current event had not been confirmed either normal or abnormal, the score as determined in step 421 may be 5.01, which is greater than the threshold, 0.05 (e.g., step 427: no). In this case, the current event may be deemed normal and an alert may not be sent. The controller 320 may proceed to step 402 and continue receiving inputs from the sensors.

If the alert is sent to the user, at step 429, the alert may comprise user interface enabling users to respond to the alert, by noting that the current event is either normal or abnormal. The users may simply forget about responding to the alert, or may designate the normality or abnormality of the current event.

At step 430, a determination may be made as to whether the user feedback is received. If the user does not respond to the alert (e.g., step 430: no), the controller 320 may proceed to step 432. On the other hand, if the user notes that the current event is normal or abnormal (e.g., step 430: yes), the controller 320 may proceed to step 431.

As previously discussed in step 425, if the same event repeats in future, the user confirmation of abnormality may be used in adjusting a score of the future event based on the confirmed abnormal event factor ($\beta_{confirmed-abnormal}$). Similarly, the user confirmation of normality may be used in adjusting the score of the future event based on the confirmed normal event factor ($\alpha_{confirmed-normal}$).

At step 431, the user confirmation for the current event may be stored in memory of the controller 320 or an external server. At step 432, the state history may be updated. The state history may be updated with the various information such as, e.g., the state transition scores (e.g. in step 413), the new state scores (e.g., in step 419), the total scores (e.g. in step 421), the adjusted scores based on the user feedback (e.g. in step 425), a determination of normality or abnormality of the current event (e.g., in step 427), and/or the user feedback (e.g., in step 431). At step 433, the updated state history may be sent to an external server (e.g., the content server 106 of FIG. 1). The controller 320 may proceed to step 402 of FIG. 4A. At step 402, the sensors of the system may continue monitoring the premises 360, regardless of whether the security system is armed or unarmed.

FIGS. 5 to 7C illustrate various examples of methods, processes and/or systems of determining whether the current event is normal or abnormal and whether to send an alert or notification to the users of the system, as described with reference to FIGS. 4A to 4E.

In this disclosure, the system may be used in machine learning environment which employs a security score to dynamically determine whether to send an alert to users. The system may be part of an AI system, etc. The system may receive, store and analyze user feedbacks or confirmations responding to the previous alerts. In general, the user feedbacks on whether an event is normal or abnormal may be accrued and studied, in order to make predictions or decisions on whether to send an alert to users. The user feedbacks may also be used to optimize a threshold score. In machine learning environment, the accumulated user feedbacks may be used for training purposes to improve accuracy on predicting whether the event is a real security threat or not. Based on this prediction capability, the system may dynamically and automatically determine whether to send a security alert to users, without being explicitly programmed.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   maintaining, by a computing device, historical sensor state values indicating historical states of a plurality of sensors;
   determining:
      a current state transition time;
      a first set of current sensor state values indicating states of the plurality of sensors prior to the current state transition time; and
      a second set of current sensor state values indicating states of the plurality of sensors after the current state transition time; and
   sending an anomalous activity alert, wherein the sending is based on:
      a first plurality of historical sensor state values, of a first set of historical sensor state values, matching the first set of current sensor state values;
      a second plurality of historical sensor state values, of a second set of historical sensor state values, matching the second set of current sensor state values; and
      a time, associated with the current state transition time, corresponding to a time window associated with the first plurality of historical sensor state values and the second plurality of historical sensor state values.

2. The method of claim 1, further comprising:
   determining a first time window centered at a time that is aligned with the time associated with the current state transition time; and
   determining second time windows located before and after the first time window, respectively,
   wherein the sending is further based on a determination of whether the first plurality of historical sensor state values and the second plurality of historical sensor state values occur in the first time window or one of the second time windows.

3. The method of claim 1, further comprising:
   determining a duration of a first time window centered at a time that is aligned with the time associated with the current state transition time,
   wherein the sending is further based on the duration matching the time window associated with the first plurality of historical sensor state values and the second plurality of historical sensor state values.

4. The method of claim 1, further comprising:
   determining a first time window centered at a time that is aligned with the time associated with the current state transition time; and
   determining two second time windows located immediately before and after the first time window, respectively, wherein the two second time windows comprise same durations.

5. The method of claim 1, wherein the sending the anomalous activity alert is further based on:
   a state transition score associated with prior sensor state transitions.

6. The method of claim 1, wherein the historical sensor state values comprise recorded times associated with prior sensor state transitions.

7. The method of claim 1, further comprising:
   applying one or more weighted scores to the first plurality of historical sensor state values and the second plurality of historical sensor state values, wherein the one or more weighted scores decrease for time windows that are farther, in time, from a time that is aligned with the time associated with the current state transition time.

8. An apparatus comprising:
   one or more processors; and
   memory storing instructions that, when executed by the one or more processors, cause the apparatus to:
      maintain historical sensor state values indicating historical states of a plurality of sensors;
      determine:
         a current state transition time;
         a first set of current sensor state values indicating states of the plurality of sensors prior to the current state transition time; and
         a second set of current sensor state values indicating states of the plurality of sensors after the current state transitions time; and
      send an anomalous activity alert based on:
         a first plurality of historical sensor state values, of a first set of historical sensor state values, matching the first set of current sensor state values; and
         a second plurality of historical sensor state values, of a second set of historical sensor state values, matching the second set of current sensor state values;
         a time, associated with the current state transition time, corresponding to a time window associated with the first plurality of historical sensor state values and the second plurality of historical sensor state values.

9. The apparatus of claim 8, wherein the instructions, when executed by the one or more processors, cause the apparatus to:
   determine a first time window centered at a time that is aligned with the time associated with the current state transition time;
   determine second time windows located before and after the first time window, respectively; and
   send the anomalous activity alert further based on a determination of whether the first plurality of historical sensor state values and the second plurality of historical sensor state values occur in the first time window or one of the second time windows.

10. The apparatus of claim 8, wherein the instructions, when executed by the one or more processors, cause the apparatus to:
    determine a duration of a first time window centered at a time that is aligned with the time associated with the current state transition time; and
    send the anomalous activity alert further based on the duration matching the time window associated with the first plurality of historical sensor state values and the second plurality of historical sensor state values.

11. The apparatus of claim 8, wherein the instructions, when executed by the one or more processors, cause the apparatus to:
    determine a first time window centered at a time that is aligned with the time associated with the current state transition time; and
    determine two second time windows located immediately before and after the first time window, respectively, wherein the two second time windows comprise same durations.

12. The apparatus of claim 8, wherein the instructions, when executed by the one or more processors, cause the apparatus to:
    send the anomalous activity alert further based on a state transition score associated with prior sensor state transitions.

13. The apparatus of claim 8, wherein the historical sensor state values comprise recorded times associated with prior sensor state transitions.

14. The apparatus of claim 8, wherein the instructions, when executed by the one or more processors, cause the apparatus to:
    apply one or more weighted scores to the first plurality of historical sensor state values and the second plurality of historical sensor state values, wherein the one or more weighted scores decrease for time windows that are farther, in time, from a time that is aligned with the time associated with the current state transition time.

15. A non-transitory computer-readable medium storing instructions, when executed, cause:
    maintaining historical sensor state values indicating historical states of a plurality of sensors;
    determining:
        a current state transition time;
        a first set of current sensor state values indicating states of the plurality of sensors prior to the current state transition time; and
        a second set of current sensor state values indicating states of the plurality of sensors after the current state transition time; and
    sending an anomalous activity alert based on:
        a first plurality of historical sensor state values, of a first set of historical sensor state values, matching the first set of current sensor state values;
        a second plurality of historical sensor state values, of a second set of historical sensor state values, matching the second set of current sensor state values; and
        a time, associated with the current state transition time, corresponding to a time window associated with the first plurality of historical sensor state values and the second plurality of historical sensor state values.

16. The non-transitory computer-readable medium of claim 15, wherein the instructions, when executed, cause:
    determining a first time window centered at a time that is aligned with the time associated with the current state transition time;
    determining second time windows located before and after the first time window, respectively; and
    sending the anomalous activity alert further based on a determination of whether the first plurality of historical sensor state values and the second plurality of historical sensor state values occur in the first time window or one of the second time windows.

17. The non-transitory computer-readable medium of claim 15, wherein the instructions, when executed, cause:
    determining a duration of a first time window centered at a time that is aligned with the time associated with the current state transition time; and
    sending the anomalous activity alert further based on the duration matching the time window associated with the first plurality of historical sensor state values and the second plurality of historical sensor state values.

18. The non-transitory computer-readable medium of claim 15, wherein the instructions, when executed, cause:
    determining a first time window centered at a time that is aligned with the time associated with the current state transition time; and
    determining two second time windows located immediately before and after the first time window, respectively, wherein the two second time windows comprise same durations.

19. The non-transitory computer-readable medium of claim 15, wherein the instructions, when executed, cause:
    sending the anomalous activity alert further based on a state transition score associated with prior sensor state transitions.

20. The non-transitory computer-readable medium of claim 15, wherein the historical sensor state values comprise recorded times associated with prior sensor state transitions.

21. The non-transitory computer-readable medium of claim 15, wherein the instructions, when executed, cause:
    applying one or more weighted scores to the first plurality of historical sensor state values and the second plurality of historical sensor state values, wherein the one or more weighted scores decrease for time windows that are farther, in time, from a time that is aligned with the time associated with the current state transition time.

* * * * *